(12) United States Patent
Benson et al.

(10) Patent No.: US 6,556,206 B1
(45) Date of Patent: Apr. 29, 2003

(54) AUTOMATED VIEWPOINT SELECTION FOR 3D SCENES

(75) Inventors: Daniel Conrad Benson, Seattle, WA (US); Brent Baxter, Plainsboro, NJ (US); Soeren Moritz, Hausen (DE); Chris Muench, Redmond, WA (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/457,805

(22) Filed: Dec. 9, 1999

(51) Int. Cl.[7] .............................................. G06T 15/70
(52) U.S. Cl. ...................................... 345/473; 345/427
(58) Field of Search .................................. 345/581, 619, 345/652, 653, 474, 781, 850, 851, 858, 622, 427

(56) References Cited

U.S. PATENT DOCUMENTS 6,222,557 B1 * 4/2001 Pulley, IV et al. .......... 345/622
6,226,008 B1 * 5/2001 Watanabe et al. ........... 345/427

OTHER PUBLICATIONS

Foley et al., Computer Graphics: Principles and Practice, Addison–Wesley, 1997, Second Edition, pp. 662–663.*

* cited by examiner

Primary Examiner—Mark Zimmerman
Assistant Examiner—Linzy McCartney
(74) Attorney, Agent, or Firm—Donald B. Paschburg

(57) ABSTRACT

A set of viewpoints for a given scene of 3D objects is defined by a system that restricts the degrees of freedom available to a user, through use of a bounding surface (a viewpoint sphere), and provides varying degrees of automation ranging from predefined viewpoints to generated tour paths, to interactive selection using free navigation. The system calculates the scene sphere, which is the minimum bounding sphere that contains the set of objects in the scene and then finds the viewpoint sphere, which is done by calculating the viewpoint sphere radius. The user then chooses the mode of viewpoint selection as either completely automated, semi-automated, or free navigation. The output is a set of viewpoints for the given scene of objects.

17 Claims, 14 Drawing Sheets

Figure 3. Flowchart for calculating the *scene sphere* though the camera is rotated, and the field of view defines how much of the scene is visible, analogous to how a camera may contain different lenses. Since a 3D scene exists in a 3D coordinate system, the position of the viewpoint can be defined by its (x, y, z) coordinates, or by its spherical coordinates (ρ, θ, φ). In these representations, the position is ultimately defined by three values so the number of possibilities for position alone is virtually infinite. Considering that orientation and field of view further add to the number of possibilities, choosing viewpoints can easily lead to information overload.

AUTOMATED VIEWPOINT SELECTION FOR 3D SCENES

BACKGROUND OF THE INVENTION

1. Field of the Invention

The present invention relates to navigating through scenes containing three-dimensional objects and more particularly to viewpoint navigation in which a path through a scene is defined by a set of known viewpoints.

2. Description of the Prior Art

One of the difficulties users often face with a three-dimensional (3D) user interface is the task of navigating through scenes of objects. It takes some skill to learn and master the methods provided by each system, especially in systems that allow freeform "flying" or "walking" in and around scenes. Though having many degrees of freedom may be considered to many a cumbersome and imprecise means of navigation, it is the method often used in many types of computer games and entertainment-based applications.

User interfaces with three-dimensional scenes for much more serious applications, such as controlling a factory or power plant, must be designed to be easy to navigate, predictable, controllable, and consistent. One way to accomplish this is through the use of viewpoint navigation in which a user's path through a scene is defined by a set of known viewpoints. Viewing the scene at a particular viewpoint is determined by input from the user or possibly from externally generated events. This type of navigation is commonly found in Virtual Reality Modeling Language (VRML) sites on the World Wide Web.

The task of defining viewpoints is often the responsibility of the author, editor, or content developer. It is certainly possible to define viewpoints in a scene manually but is complicated by the fact that there are virtually an infinite number of possibilities. As an example, using a commercial 3D scene editor such as Kinetix 3D Studio Max, a camera viewpoint object may be inserted, positioned, and oriented in a scene. Of course, this requires a significant amount of skill to place and manipulate objects in a scene. Another method one might take is to specify coordinates and other parameters that describe a ViewPoint node such as in a VRML scene graph. However, working at the level of coordinate values and having no visual feedback requires even greater knowledge and experience of 3D systems.

SUMMARY OF THE INVENTION

The present invention greatly simplifies the problem of defining a set of viewpoints for a given scene of 3D objects. It is based on providing visual feedback as the viewpoints are defined as well as an automated process that can be practiced by novice and expert-level users. The present invention simplifies the problem by restricting the degrees of freedom available to the user through the use of a bounding surface (a viewpoint sphere), and by providing varying degrees of automation ranging from predefined viewpoints to generated tour paths, to interactive selection using free navigation.

The present invention includes three modes of operation that vary in ease-of-use and customization. The three modes of operation are: 1) completely automated calculation of viewpoints, 2) semi-automated selection through "tours", and 3) free navigation around a restricted viewpoint space. Given a set of 3D objects in a scene, the task is to generate a set of viewpoints using the present invention. The first step is to calculate the scene sphere, which is the minimum bounding sphere that contains the set of objects in the scene. The second step is to find the viewpoint sphere, which is done by calculating the viewpoint sphere radius. The user then chooses the mode of viewpoint selection as either completely automated, semi-automated, or free navigation. The output from the final steps is a set of viewpoints for the given scene of objects.

DETAILED DESCRIPTION OF THE INVENTION

Figure 2:
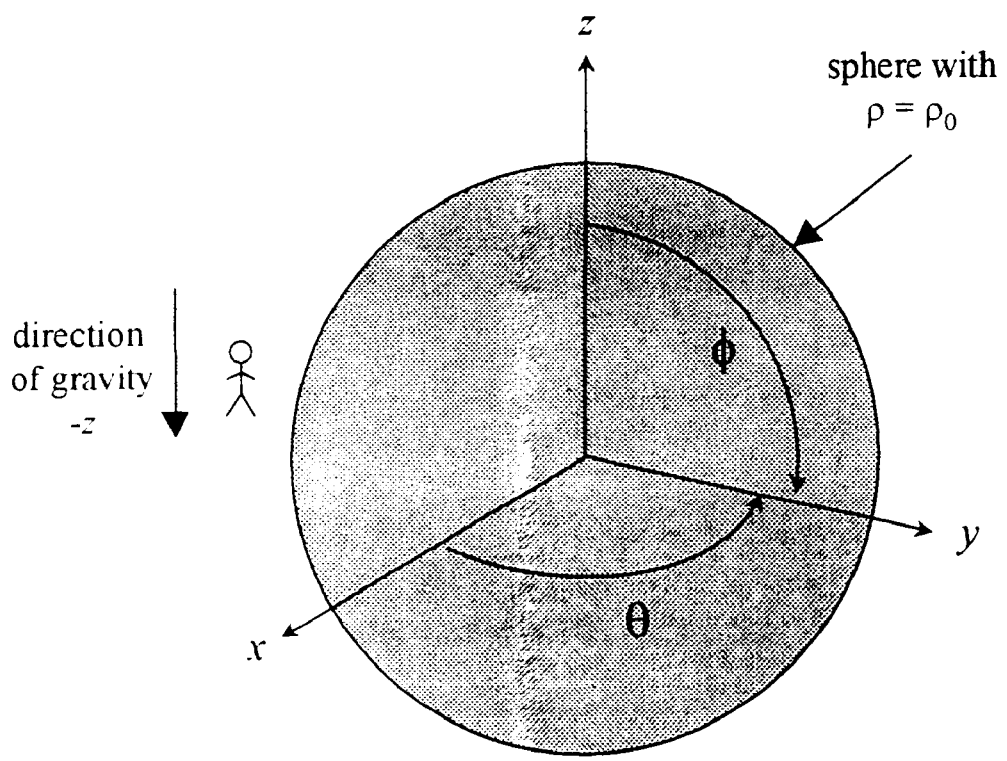
FIG. 2 illustrates an orthogonal coordinate system, spherical coordinates and direction of gravity.

Throughout this description, references are made to a conventional 3D coordinate system with x, y, and z orthogonal axes as shown on FIG. 2. For simplicity, a spherical coordinate system with coordinates ρ, θ, and φ is also used in describing the invention, however the invention is not restricted in any way by a particular coordinate system. Also, the direction of "gravity" is defined in the negative z direction using the coordinate system as defined in FIG. 2. The use of gravity comes into play with the idea that the 3D scenes represent physical reality in which objects are most often positioned such that positive z is "up" and negative z is "down". The relevance is that the viewpoints are restricted to this same orientation, that is, no rotation about its directional axis. In other words, the viewpoints are oriented such that the user's "feet" always point down.

The notion of viewpoints within a scene is well understood. A viewpoint defines a position, orientation, and field of view for viewing a scene in a given 3D coordinate system. A viewpoint can be thought of as a camera through which one peers. The position defines where the camera is placed in space, the orientation defines an arbitrary axis about which the camera may be rotated, and the field of view defines the visible portion of the view, where a smaller field of view corresponds to a telephoto lens on a camera and a larger field of view corresponds to a wide-angle lens on a camera.

One of the factors that make navigation and viewpoint specification complicated for most users is the number of degrees of freedom in a 3D coordinate system. Using the camera analogy, the camera can be placed at virtually any 3D location, it can be pointed in any 3D direction, rotated along that axis and the field of view, specified in radians, can range between 0 and $\pi$.

The set of applications that this invention is intended to support will want only those viewpoints that show the objects in the scene, are located a distance away from the objects, and are oriented in an upright manner corresponding to the notion of "up" in the coordinate system of FIG. 2. For example, it is not desirable to define a viewpoint that does not show any of the objects in the scene or shows the scene upside down or at a non-perpendicular angle. Given these prerequisites, the problem can be simplified by reducing the degrees of freedom with the following restrictions applied to viewpoints:

1. each viewpoint field of view is fixed (default value is $\pi/4$, or 45°)
2. each viewpoint location is fixed to lie on the surface of a sphere, which is referred to as the viewpoint sphere, with a fixed radius centered on the scene
3. each viewpoint orientation is set to point to the center of the scene, which is referred to as the focus point, with its "up" vector tangent to the viewpoint sphere aimed in the positive z direction.

Figure 1:
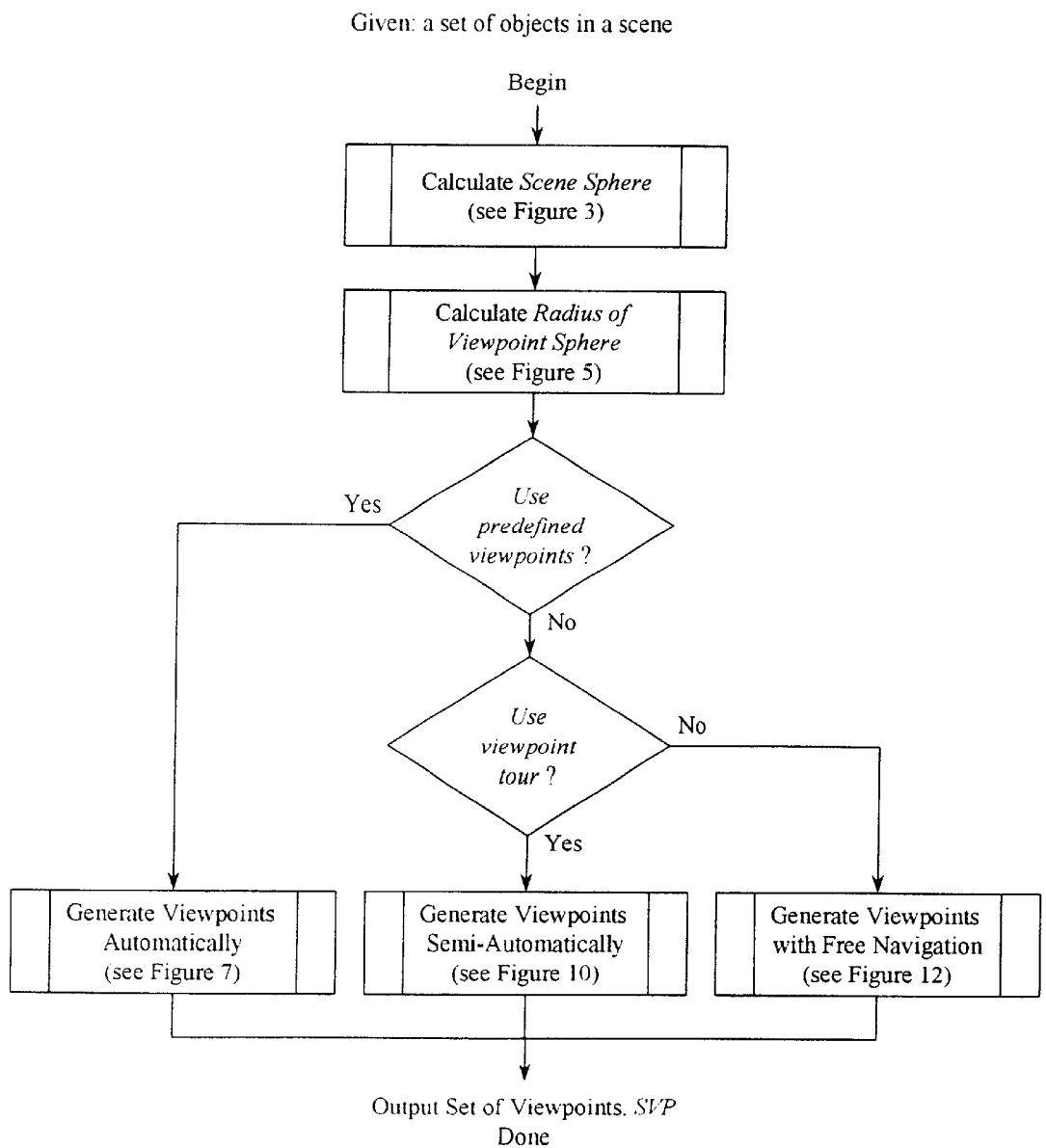
FIG. 1 illustrates a flowchart of one embodiment of the present invention comprising three modes of generating viewpoints.

The following describes a general solution based on a viewpoint sphere centered on a scene of objects but, as will be shown, these restrictions can be lessened if desired. For example, the field of view and the focus point may be adjusted and the viewpoint sphere can be replaced with a hemisphere, a three-dimensional ellipse or other bounding shape. An overall block diagram of the present invention is shown in FIG. 1. Given a set of 3D objects in a scene, the task is to generate a set of viewpoints using the present invention. The first step is to calculate a scene sphere (see FIG. 3), which is the minimum bounding sphere that contains the set of objects in the scene. The second step is to find a viewpoint sphere, which is done by calculating a viewpoint sphere radius (see FIG. 5). The user then chooses the mode of viewpoint selection as either a completely automated calculation of viewpoints with predefined viewpoints (see FIG. 7), a semi-automated selection through "tours" (see FIG. 10), or free navigation around a restricted viewpoint space (see FIG. 12). The output from the final steps is a set of viewpoints for the given scene of objects.

Figure 3:
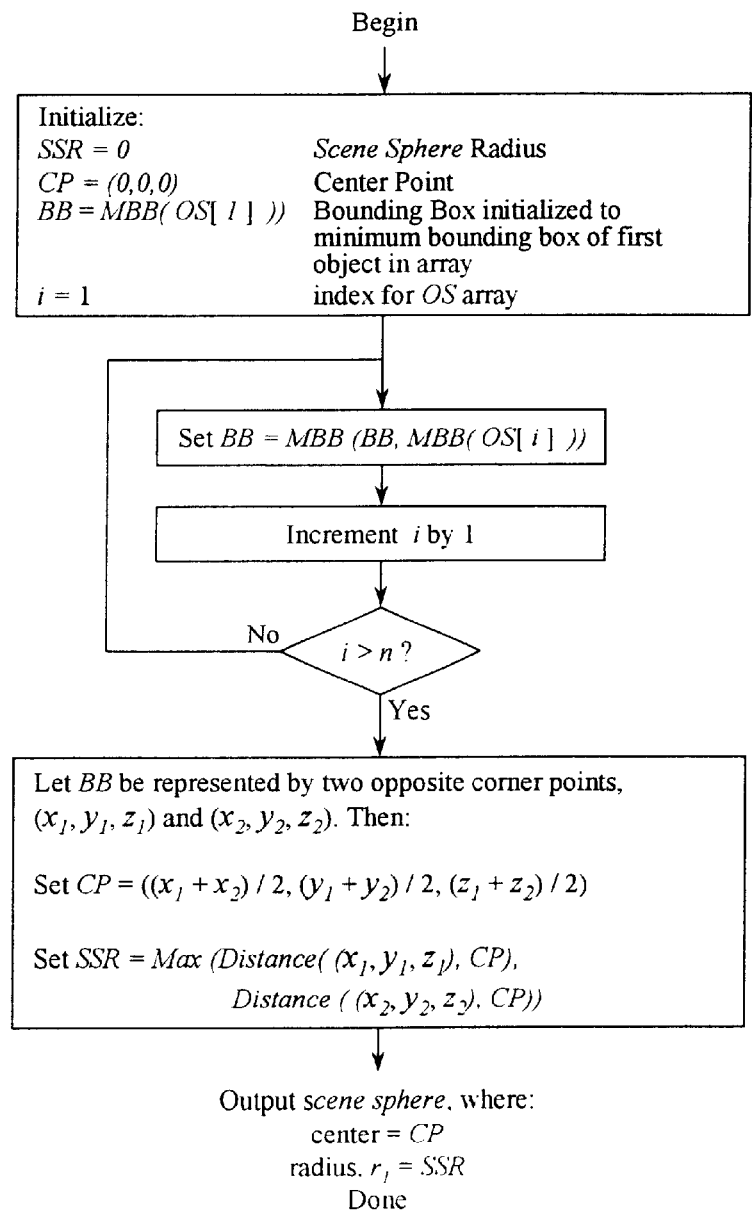
FIG. 3 illustrates a flowchart for calculating a scene sphere.
Figure 4:
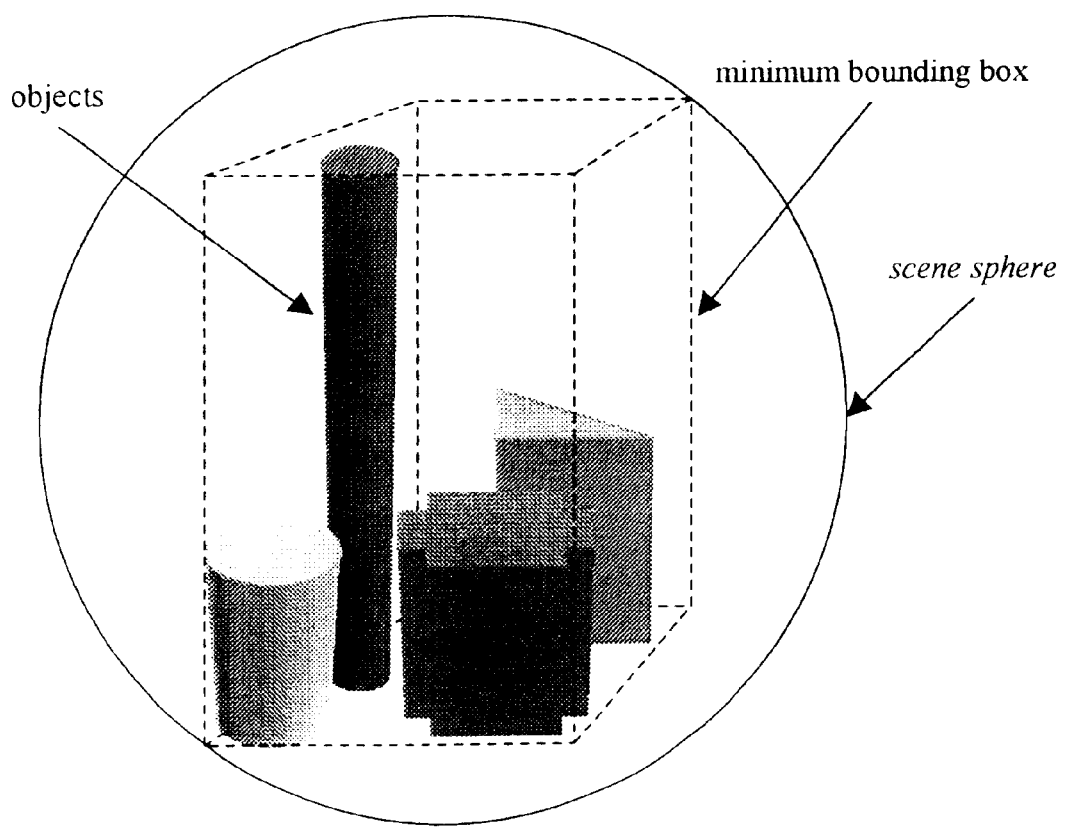
FIG. 4 illustrates an example of the scene sphere using a minimum bounding box.

The following will describe calculating the viewpoint sphere. Given a set of one or more objects comprising a 3D scene, it is necessary to find the smallest sphere that completely encloses all the objects in the scene, referred to as the minimum bounding sphere, or scene sphere. This can be done using one of many well-known methods. A very simple method is to find the minimum bounding box containing all of the objects in the scene and then to define the minimum bounding sphere to be centered on the box with a diameter equal to the longest distance between opposite corners of the box. The flowchart for this procedure is given in FIG. 3 and an example is illustrated in FIG. 4. In FIG. 3, the scene sphere radius, the center point, the bounding box and the index for the array of objects in the scene are initialized. The bounding box is then set to the minimum bounding box that contains both the previous bounding box and the minimum bounding box of the object in the scene array indexed by the index variable. The index variable is then incremented by one. A calculation then takes place where the final bounding box is represented by two opposite corner points $(x_1, y_1, z_1)$ and $(x_2, y_2, z_2)$, the center point (CP) is set equal to $((x_1+x_2)/2, (y_1+y_2)/2, (z_1+z_2)/2)$ and the scene sphere radius is set equal to Max(Distance($(x_1, y_1, z_1)$, CP), Distance ($(x_2, y_2, z_2)$, CP). Note that the minimum bounding box function returns the minimum bounding box that completely contains the object argument(s). The Max function returns the maximum value of the two passed arguments and the Distance function returns the distance between the two point arguments. Implementations of these functions are well known in the art.

Figure 5:
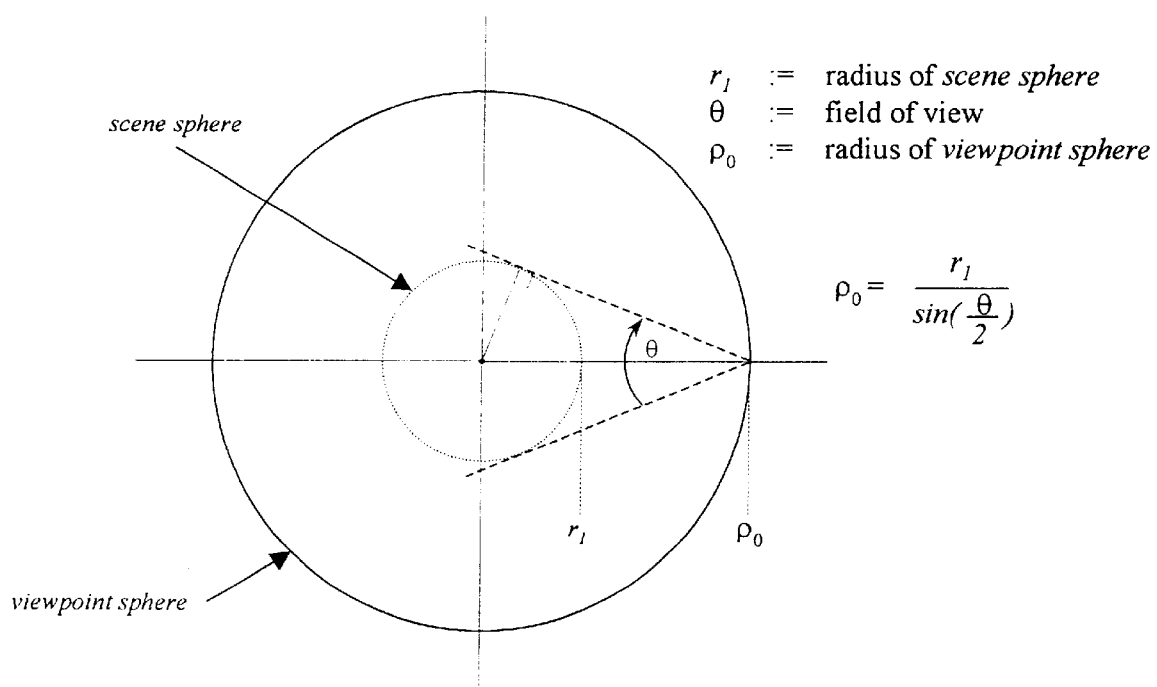
FIG. 5 illustrates calculating the radius of the viewpoint sphere.
Figure 6:
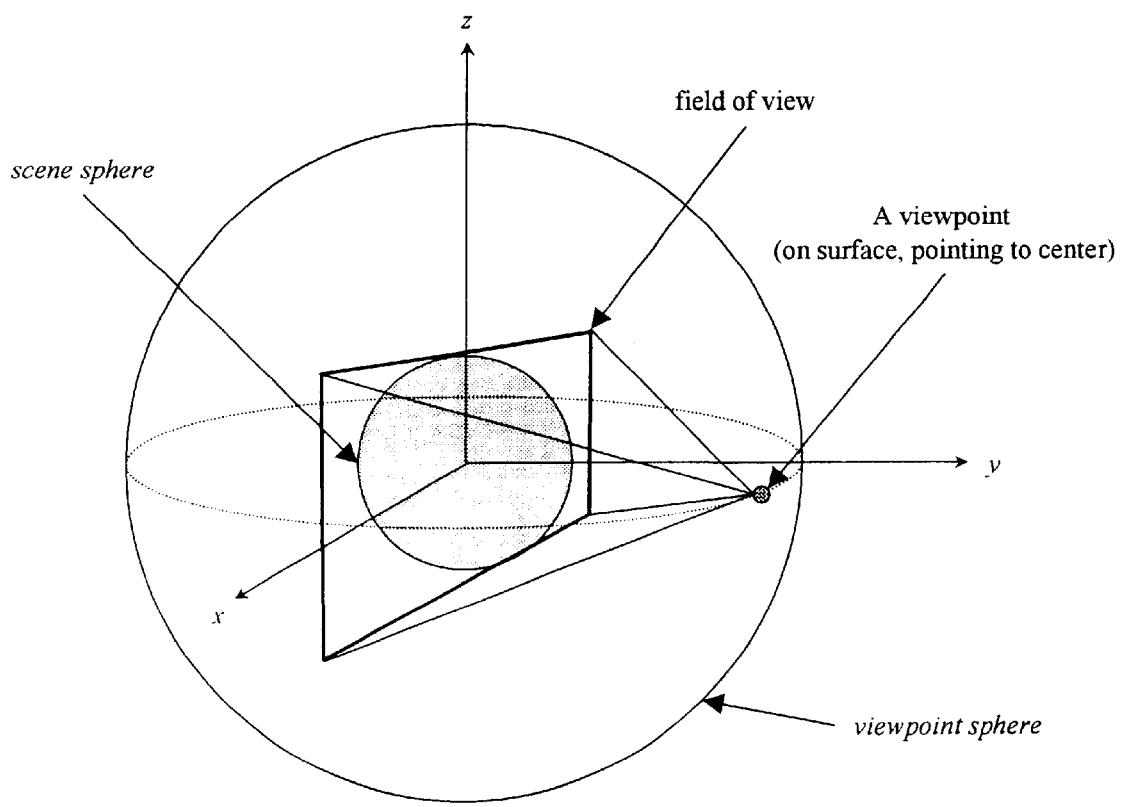
FIG. 6 illustrates the relationship of the scene sphere and the viewpoint sphere (3D Perspective).

Having found the scene sphere, the focus point and the center of the viewpoint sphere is set to be the center point of the scene sphere. The radius of the viewpoint sphere is set such that the entire scene sphere is visible within the field of view of a viewpoint placed at the surface of the viewpoint sphere, oriented to point at the center of the viewpoint sphere. FIG. 5 illustrates the relationships by showing a 2D plane through the center of the viewpoint sphere. A 3D representation of this is shown in FIG. 6. Calculation of the radius of the viewpoint sphere, $\rho_0$, is as follows:

Given:

$r_1$=radius of scene sphere $\theta$=field of view

Find:

$\rho_0$=radius of viewpoint sphere

Solution:

$$\rho_0 = \frac{r_1}{\sin\left(\frac{\theta}{2}\right)}$$

The following will describe automated viewpoint selection. The first mode of operation is a completely automated method for generating viewpoints for a given scene. The basic idea is to generate a set of viewpoints at predefined locations on the surface of the viewpoint sphere. In other words, once the viewpoint sphere has been determined as above, a set of viewpoints are placed at predefined positions on the sphere with each oriented towards the center, or focus point.

Figure 7:
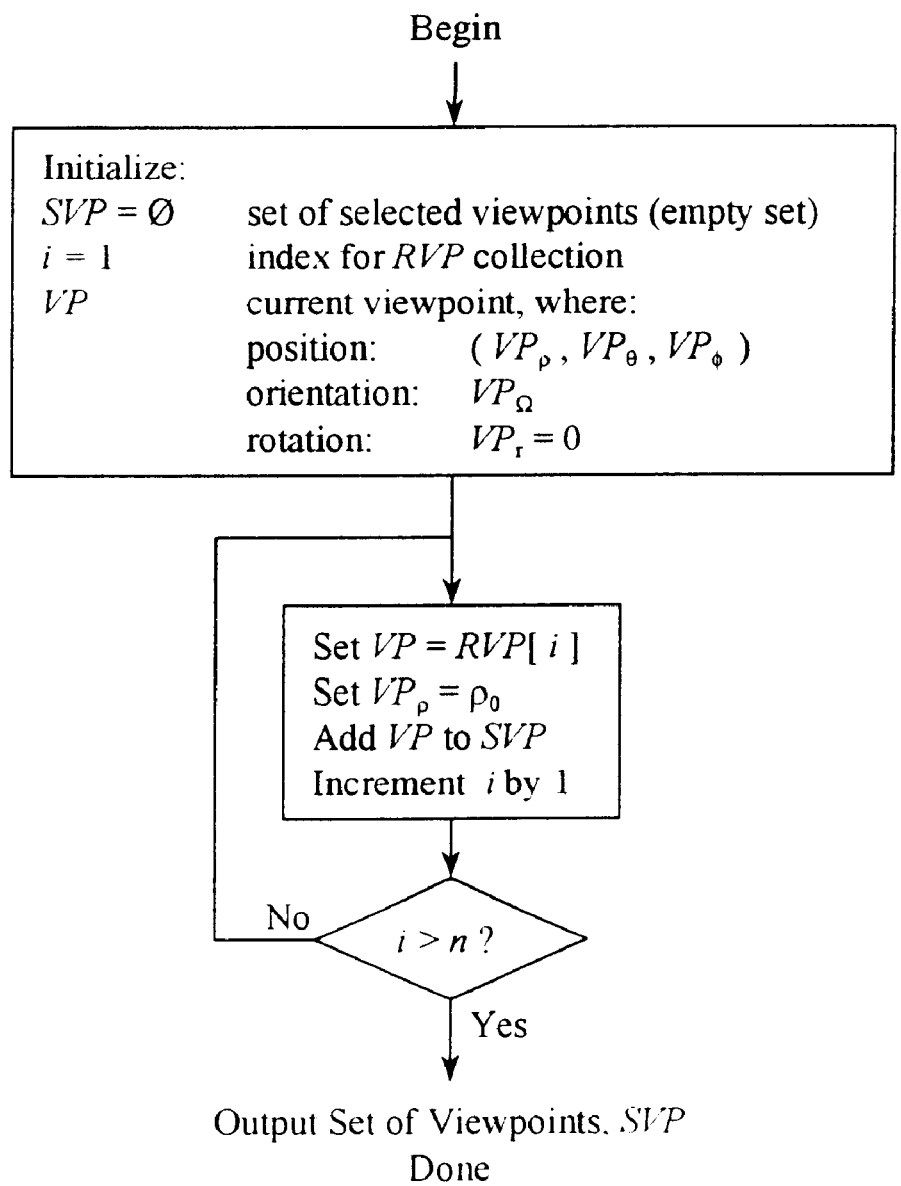
FIG. 7 illustrates a flowchart of one embodiment of the automated generation of viewpoints.

The predefined viewpoint positions are defined on a unit reference sphere, centered at the origin, having a radius of one unit. These viewpoint positions are then mapped to the viewpoint sphere by a simple scaling operation, using the viewpoint sphere radius, or $\rho_0$. The method for automatically generating a set of viewpoints for a given 3D scene is described in the flowchart of FIG. 7. In FIG. 7, the set of selected viewpoints (initially the empty set), the index for the set of predefined viewpoints positioned on a unit reference sphere and the current viewpoint are initialized. A calculation then takes place where the current viewpoint is set equal to the predefined viewpoint positioned on a unit reference sphere referenced by the array index. The radius of the current viewpoint is set equal to the viewpoint sphere radius and the current viewpoint is added to the set of selected viewpoints. The output is the set of selected viewpoints.

Figure 8:
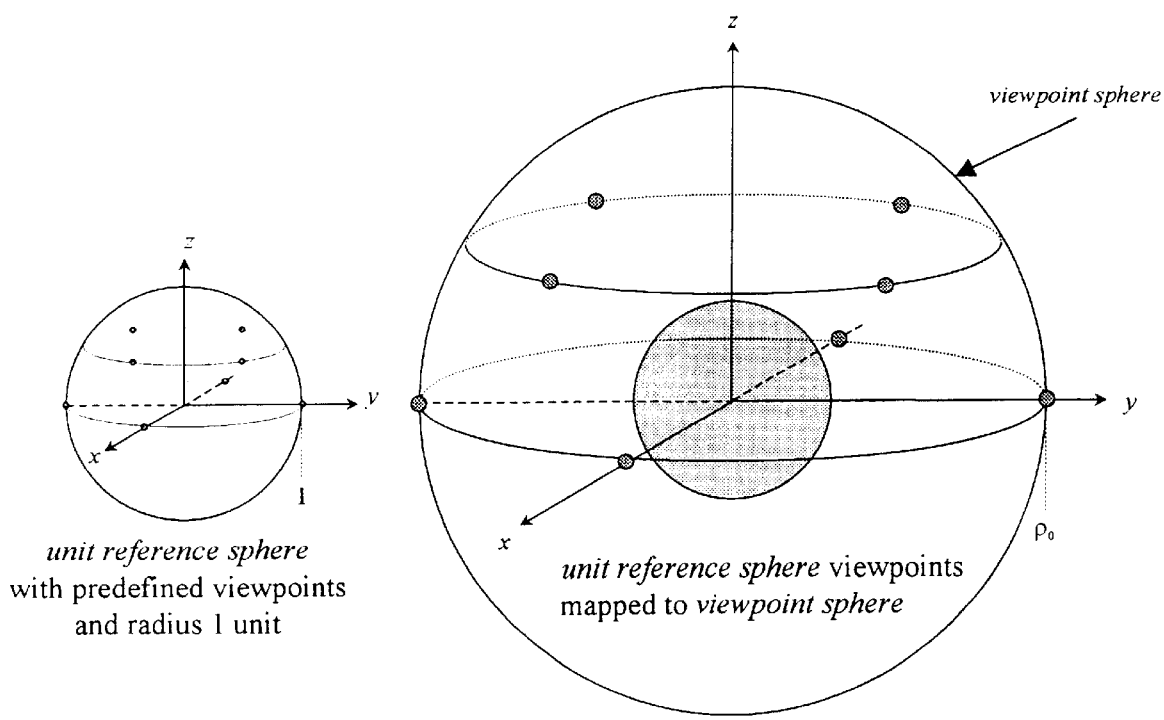
FIG. 8 illustrates an example of automated viewpoint selection using predefined viewpoints.

This method is illustrated with an example using a set of eight predefined viewpoints positioned in the upper hemisphere. FIG. 8 shows the unit reference sphere on the left, and on the right the final set of viewpoints mapped to the viewpoint sphere. In this example, four viewpoints are located in the xy plane on the x and y axes, or in spherical coordinates $(\rho_0, \pi/2, 0)$, $(\rho_0, \pi/2, \pi/2)$, $(\rho_0, \pi/2, \pi)$, and $(\rho_0, \pi/2, 3\pi/2)$. Four other viewpoints are located at $(\rho_0, \pi/4, \pi/4)$, $(\rho_0, \pi/4, 3\pi/4)$, $(\rho_0, \pi/4, 5\pi/4)$, and $(\rho_0, \pi/4, 7\pi/4)$.

The following will describe a second mode of operation of the present invention semi-automated viewpoint selection using "tours". The second mode of operation is a semi-automated, interactive method for selecting viewpoints for a given scene. The basic idea is to automatically generate a viewpoint "tour" or path that traverses the surface of the viewpoint sphere in a deterministic manner. The tour is realized as an animated view, somewhat like watching a video produced by looking through the viewfinder of a camera while it is being moved smoothly around the scene of objects. The path of the camera is predetermined and the user is able to control the "speed" of the camera or how quickly the camera moves from point to point.

As the tour proceeds, the user sees the entire scene from the current viewpoint. At any point in the tour the user may indicate that the current viewpoint be designated as a new viewpoint to be added to the set of selected viewpoints. At the end of the tour the user will have defined a number of viewpoints for the given scene. The set of viewpoints may then be reviewed, individual viewpoints may be removed from the set, or new viewpoints may be added to the set from subsequent tours through the scene.

There are unlimited possibilities for defining a tour path that traverses the surface of a viewpoint sphere. For practical purposes, a sequence of tour rings is defined along the surface of the viewpoint sphere that "slice" the sphere along the xy axes at regular intervals by varying $\phi$. The interval, $\delta$, is calculated based on the number of rings desired as $\pi/(n+1)$, where n is the number of rings.

Figure 9:
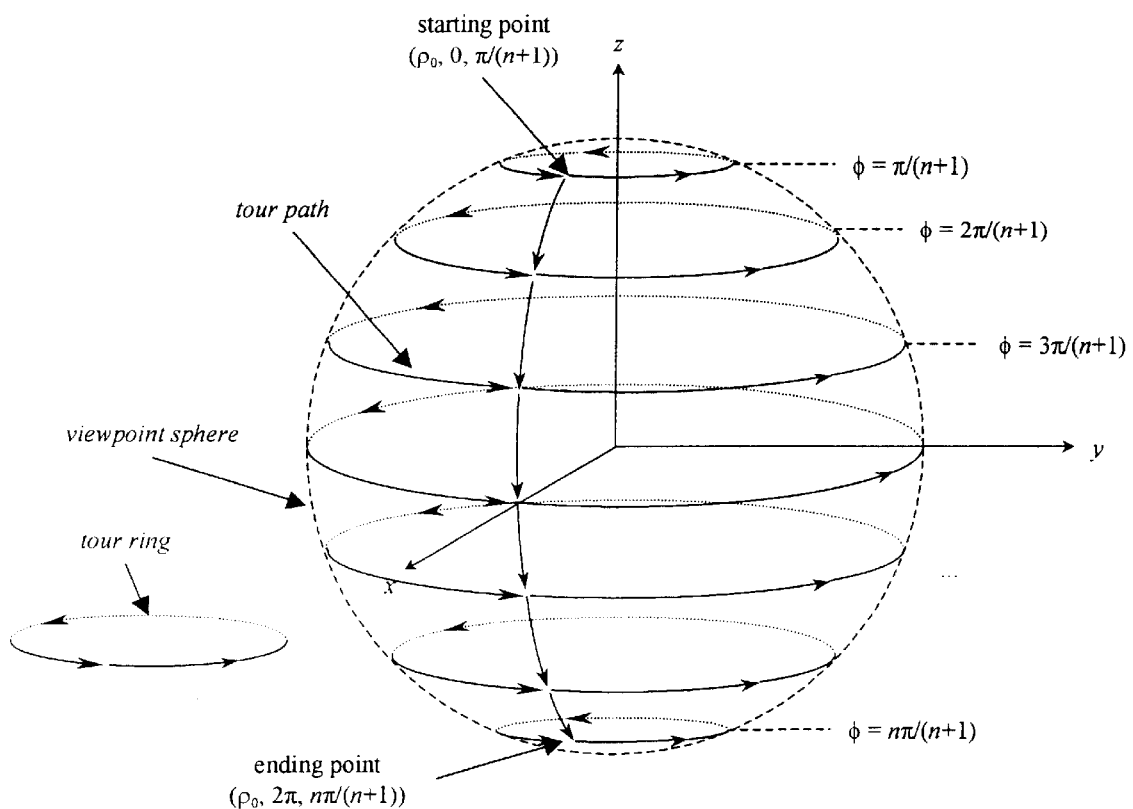
FIG. 9 illustrates generating the tour path from a set of tour rings.

The four path begins by circumnavigating the first ring by varying $\theta$ from 0 to $2\pi$, moving to the next ring, circumnavigating that ring, moving to the next ring, and so on, until all the rings have been traversed. An example of a tour path generated using n=7 tour rings ($\delta=\pi/8$) is illustrated in FIG. 9, where the tour begins at the "north pole" and ends after circumnavigating the "south pole".

Figure 10:
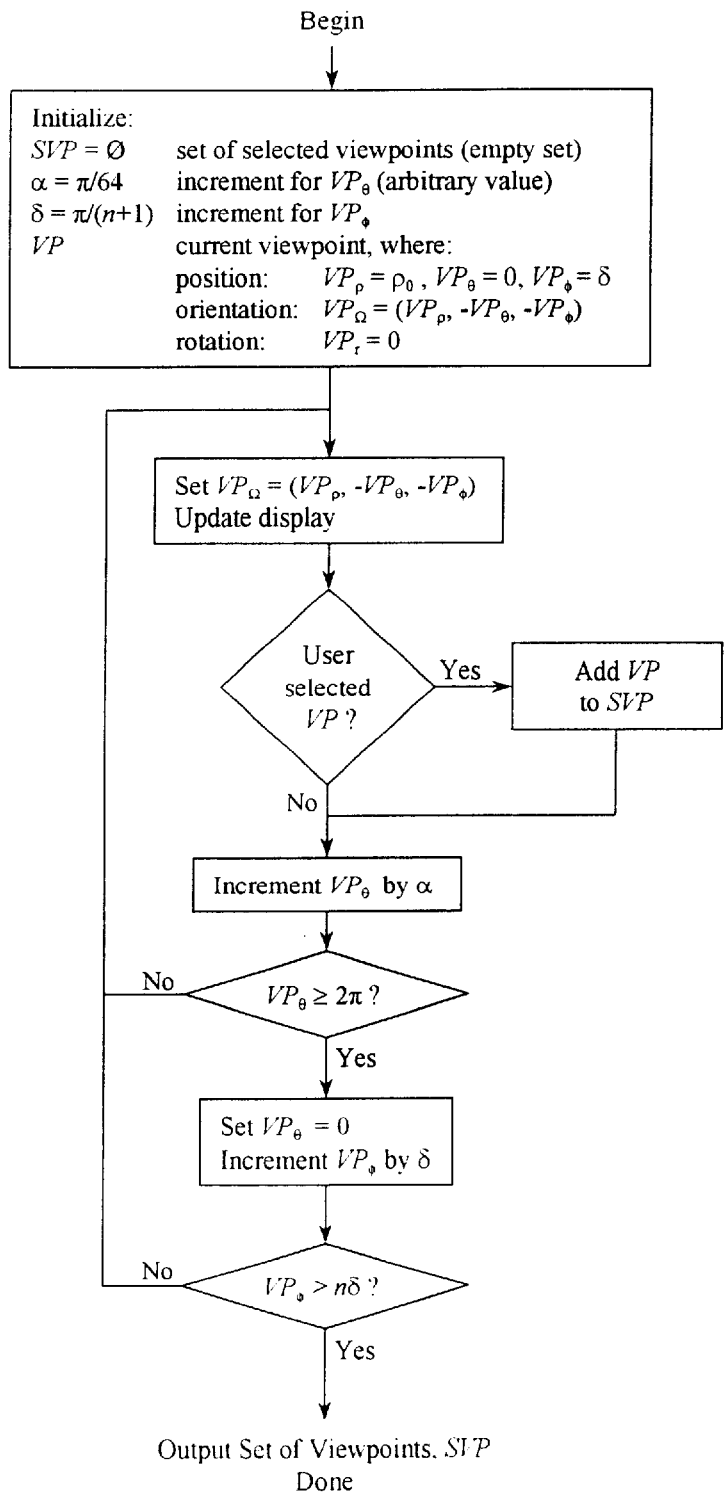
FIG. 10 illustrates a flowchart for one embodiment of the semi-automated viewpoint selection using tours.

Given the viewpoint sphere radius $\rho_0$ and the number of tour rings desired, the complete tour path may be generated using the flowchart in FIG. 10. As an interactive process, the visual display is updated each time the current viewpoint coordinates change. The current viewpoint, VP, is always oriented to point at the center, or focus point, and its rotation is always set to 0. At any time the user may indicate that the current viewpoint is to be added to the set of selected viewpoints, SVP, by means such as pressing a key or clicking a button on the display.

Note that there are additional control options available for the user that are not described in the basic algorithm. These options include adjusting the speed of the tour, changing the direction along the tour path (forward and reverse), and pausing, resuming, and stopping the tour. When the tour is completed the result is a set of selected viewpoints, SVP.

The third mode of operation, viewpoint selection using free navigation around a restricted viewpoint space, allows the user to navigate freely about the viewpoint sphere rather than follow a predefined path. In this case, the user may move anywhere on the viewpoint sphere by adjusting $\phi$ and $\theta$. As before, the current viewpoint orientation is always aimed at the focus point and the rotation is fixed at 0. Additionally, the user may also vary the field of view of the viewpoint. Because the radius of the viewpoint sphere is constrained as a function of the field of view, the resulting effect is of zooming in and zooming out from the scene. These options give a great deal of freedom to the more advanced user while maintaining enough control to prevent the user from getting "lost" or generating "non-interesting" viewpoints.

Figure 11:
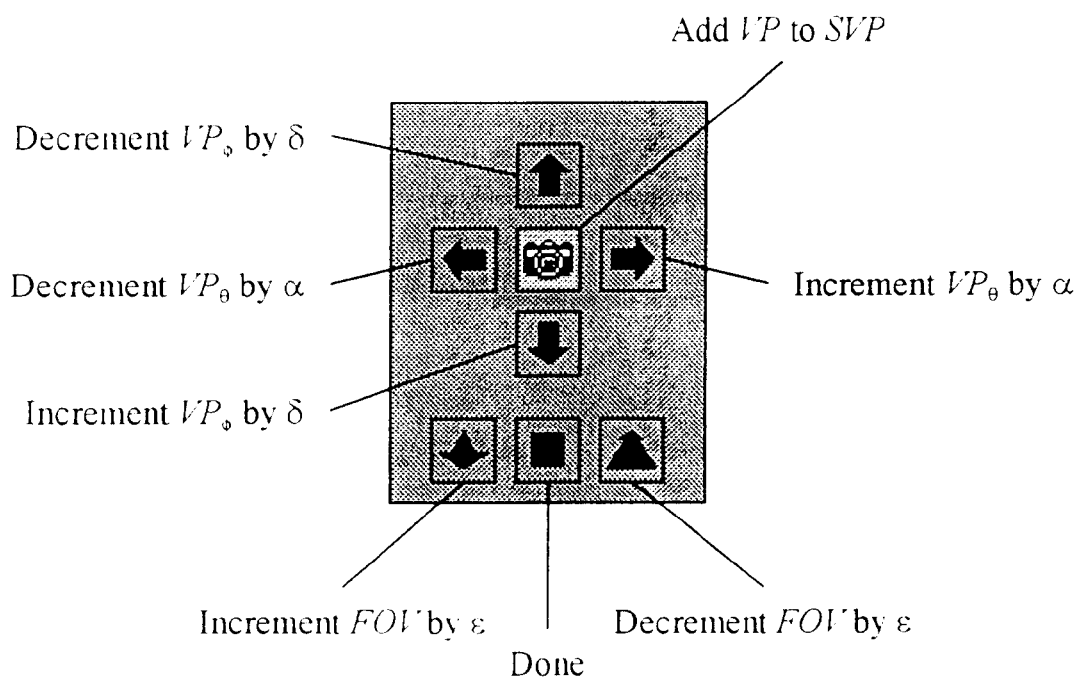
FIG. 11 illustrates a simple control panel for viewpoint selection using free navigation.

The main difference between the tour method and the free navigation method is that the user controls where the viewpoint travels around the viewpoint sphere. This can be done using various input methods. For simplicity, a basic control panel is defined with navigational buttons to alter the current viewpoint coordinates, thereby moving around the sphere. The main functions of the interface are to increment and decrement each of the three coordinates of the current viewpoint (traverse the surface of the viewpoint sphere), change the radius of the viewpoint sphere (in effect, zoom-in and zoom-out), select the current viewpoint (add VP to SVP), and stop the process. A sample control panel for free navigation is shown in FIG. 11 and the functions for each button are explained in the flowchart of FIG. 12.

Figure 12:
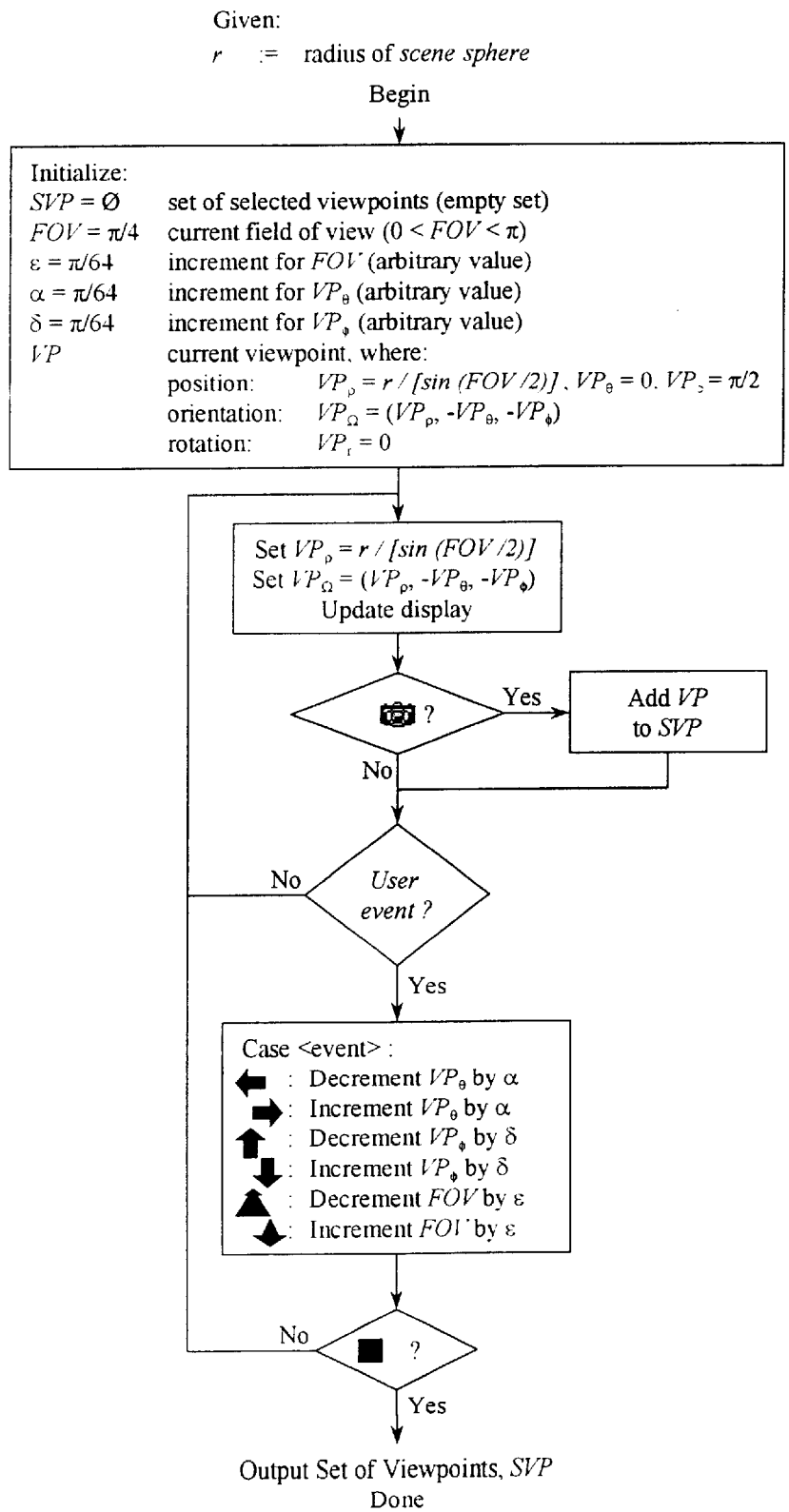
FIG. 12 illustrates a flowchart of one embodiment of interactive viewpoint selection using free navigation.
Figure 13:
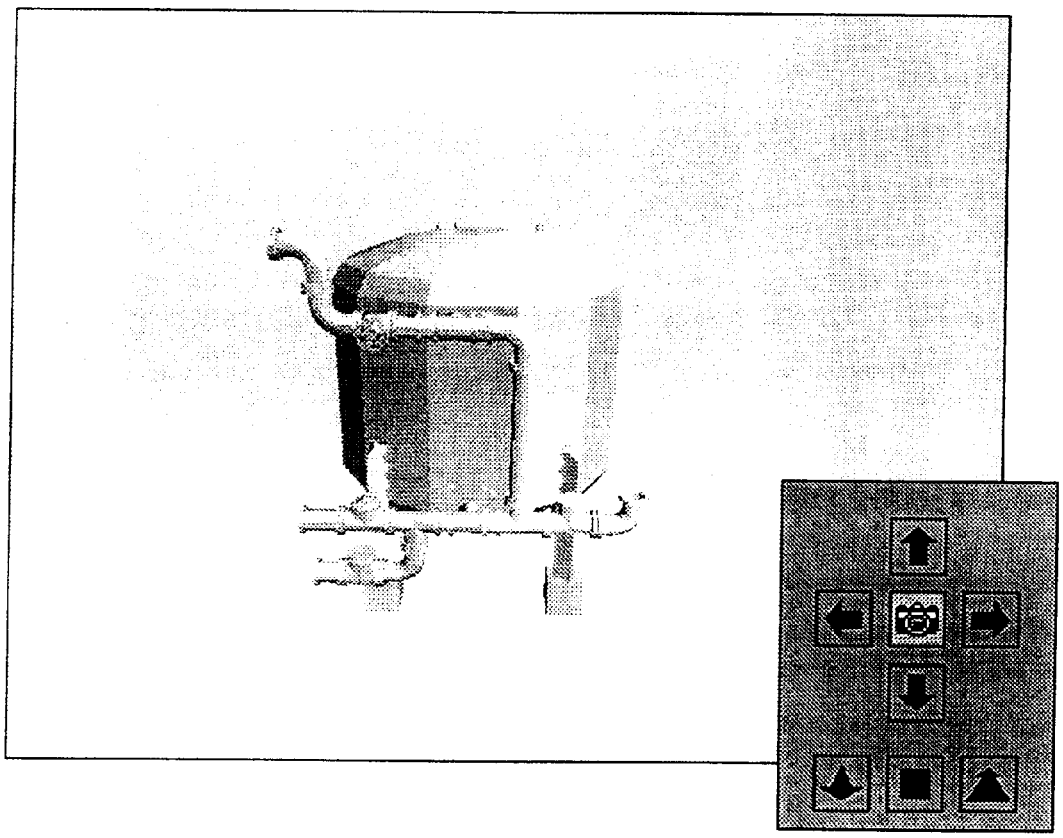
FIG. 13 illustrates an example interface with free navigation control panel.
Figure 14:
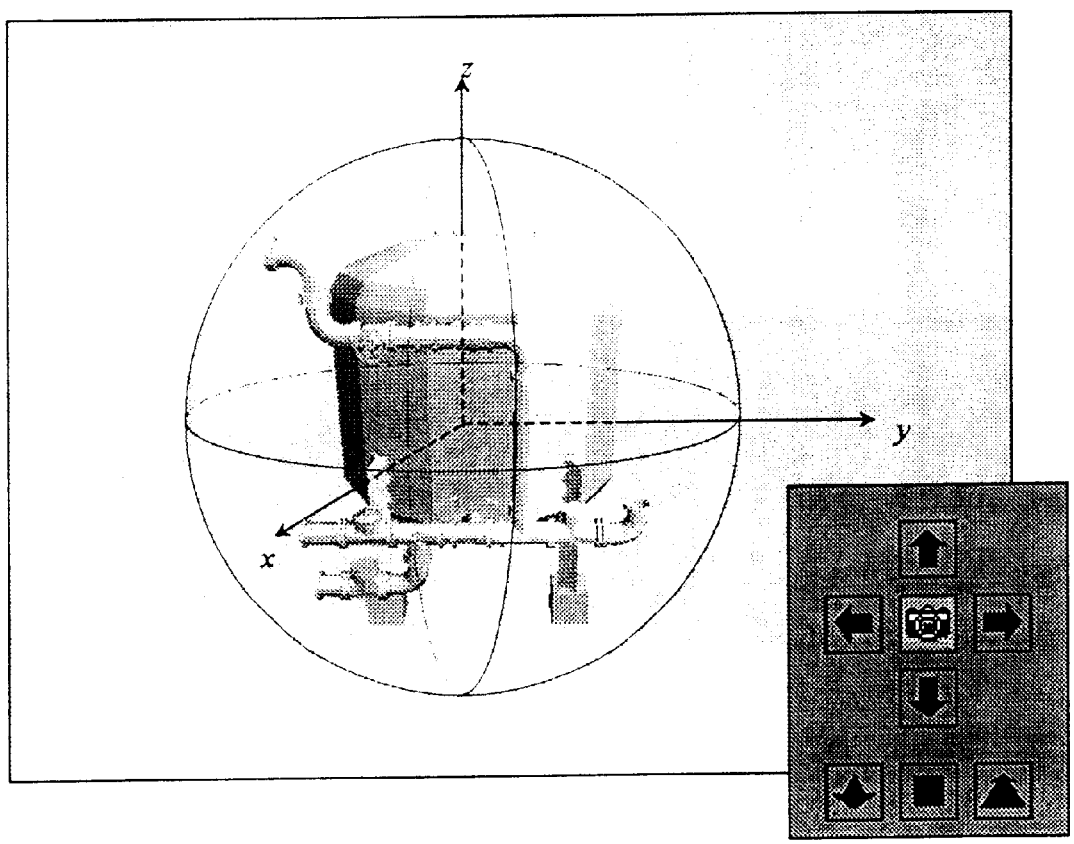
FIG. 14 illustrates an example interface with coordinate system and scene sphere superimposed.

The main difference between this algorithm and the one used for the interactive tour path method is to accept additional input from the user as depicted in FIG. 12. An example scene with a floating control panel is illustrated in FIG. 13, and FIG. 14 shows the same example with the coordinate system and scene sphere superimposed over the scene.

As described above, the present invention provides a system for automated viewpoint selection of 3D scenes in which the basic idea is to simplify the task in two ways:

1. by restricting the degrees of freedom available to the user through the use of a bounding surface (the viewpoint sphere), and
2. by providing varying degrees of automation ranging from predefined viewpoints to generated tour paths, to interactive selection using free navigation.

Various embodiments of the present invention are certainly possible and a few embodiments are described below.

The present invention described above uses a sphere as the bounding surface for viewpoints mainly because of the simplicity in calculations, but there is no reason why it has to be a sphere. For instance, there will be many cases in which a hemisphere is more desirable. If a scene consists of various pieces of machinery positioned on the floor in a room, it would make more sense to define a hemisphere that covered the objects, somewhat like a large bubble that landed on the ground and covered the scene like an umbrella. In this case, the focus point should also be set at the center of the objects, such as their center of mass, rather than the center of the hemisphere, which would be on the floor.

Another example in which a sphere is not necessarily the best choice might be a scene consisting of a group of objects positioned in a long line, such as a manufacturing assembly line or sequence of conveyor lines. In this case, a hemispherical ellipsoid would more closely match the space surrounding the objects and would serve as a better viewpoint bounding surface. Also, as an ellipse has two center points, there could be two focus points in which each viewpoint is aimed at its closest one.

In each of these embodiments, the same principles would apply as presented in the present invention, but the calculations would require modifications to fit the corresponding bounding surface.

The description of the present invention above described a system of calculating the size of the viewpoint sphere based on the scene sphere, which determines the distance between any given viewpoint and the objects in the scene. A variation on this system is to take advantage of additional information that may be included in the object models. For instance, a scene of VRML objects may include level-of-detail nodes (LOD) that are used to vary the degree of detail for different viewing distances from the objects. An object may contain any number of ranges (or distances), and for each range will have a different geometry or appearance. This technique approximates reality in the sense that you gradually discern more detail the closer you get to an object. The main purpose of LOD nodes are to improve performance by reducing the amount of work required by the browser.

Given such a scene with LOD nodes, the values specified for LOD distances can be used to calculate the viewpoint sphere (or other surface shape). The main benefit is that because the set of viewpoints generated all fall within a given LOD range, improved performance is possible when navigating among those viewpoints. Another reason to use LOD ranges to calculate viewpoints is the objects may have been intended to be viewed at certain distances for optimal viewing.

The description of the present invention above described three modes of operation that vary in the degree of automation of the selection process and the flexibility provided to the user. The first mode relies on a set of predefined viewpoints arranged on a unit reference sphere. One variation here is to provide a set of predefined arrangements from which the user may choose. A set may consist of upper hemisphere viewpoints only, lower hemisphere viewpoints only, both upper and lower, as well as different numbers of viewpoints and distributions.

The second mode uses a tour path made up of a number of tour rings. The tour rings were described as parallel to the xy axis. A variation here might be rings that are parallel to the xz or yz axis, or even parallel to an arbitrary axis.

The third mode provides the user with the most flexibility in navigating around a bounding surface. A variation of this method could remove the functional dependency between the field of view and the radius of the viewpoint sphere, thereby allowing the viewpoint to show only a portion of the scene rather than the entire scene. This would make it possible, for example, to define viewpoints that are very close to objects, in between objects, or even inside objects.

Finally, in each of the three modes described, the final outcome of the viewpoint selection process is a set of viewpoints defined for viewing a 3D scene. Additional functions include the ability to review the set of viewpoints, remove specific viewpoints from the set, add additional viewpoints, add descriptive attributes to viewpoints such as a name, or other types of attributes such as security permissions.

As stated above, the present invention provides that a set of viewpoints around a 3D scene may be easily specified in an automated and deterministic fashion. Reducing the degrees of freedom, by restricting the orientation and path of the viewpoints around a bounding surface, greatly simplifies the task of navigating around a scene. Using the invention described here, the process of selecting viewpoints may range from a completely automated process to semi-automated selection to free navigation in a restricted space. Finally, this system may be applied to a single object or a set of objects comprising a scene and may be practiced by novice and expert-level users.

It is not intended that this invention be limited to the hardware or software arrangement, or operational procedures shown disclosed. This invention includes all of the alterations and variations thereto as encompassed within the scope of the claims as follows.

What is claimed is:

1. A system for automated viewpoint selection for 3D scenes comprising:
   a bounding surface calculator for receiving a set of objects of a 3D scene and for restricting degrees of freedom available through use of a viewpoint sphere; and
   a viewpoint calculator connected to said bounding surface calculator for generating viewpoints through varying degrees of automation including one of automated calculation of viewpoints, semi-automated selection, and free navigation around a restricted viewpoint space wherein said viewpoint calculator comprises:
      a semi-automatic viewpoint generator connected to said bounding surface calculator wherein said semi-automatic viewpoint generator comprises:
         definition means for defining a tour path that traverses a surface of said viewpoint sphere.

2. A system for automated viewpoint selection for 3D scenes as claimed in claim 1 wherein said bounding surface calculator comprises:
   a scene sphere calculator for receiving a set of objects of a 3D scene; and
   a radius of viewpoint sphere calculator connected to said scene sphere calculator.

3. A system for automated viewpoint selection for 3D scenes as claimed in claim 2 wherein a scene sphere calculator comprises:
   an initializer for initializing a scene sphere radius, a center point, a bounding box and an index for array of objects in a 3D scene;
   set means for setting said bounding box to a minimum bounding box;
   an incrementer for incrementing an index variable for said minimum bounding box by one; and
   an output calculator for calculating an output scene sphere where said bounding box is opposite corner points ($x_1$, $y_1$, $z_1$) and ($x_2$, $y_2$, $z_2$), said center point is equal to (($x_1+x_2$)/2, ($y_1+y_2$)/2, ($z_1+z_2$)/2) and said scene sphere radius is equal to Max (Distance(($x_1$, $y_1$, $z_1$), CenterPoint), Distance (($x_2$, $y_2$, $z_2$), Center Point).

4. A system for automated viewpoint selection for 3D scenes as claimed in claim 2 wherein a radius of viewpoint sphere calculator comprises:

calculation means for calculating $\rho_0 = r_1/\sin(\theta/2)$ wherein
      $r_1$ is radius of a scene sphere,
      $\theta$ is a field of view, and
      $\rho_0$ is radius of said viewpoint sphere.

5. A system for automated viewpoint selection for 3D scenes comprising:
   a bounding surface calculator for receiving a set of objects of a 3D scene and for restricting degrees of freedom available through use of a viewpoint sphere; and
   a viewpoint calculator connected to said bounding surface calculator for generating viewpoints through varying degrees of automation including one of automated calculation of viewpoints, semi-automated selection, and free navigation around a restricted viewpoint space wherein said viewpoint calculator comprises:

an automatic viewpoint generator connected to said bounding surface calculator wherein said automatic viewpoint generator comprises:
an initializer for initializing a set of selected viewpoints, an index for a set of predefined viewpoints positioned on a unit reference sphere, and a current viewpoint; and
an output set calculator for calculating an output set of viewpoints where said current viewpoint is set equal to said set of predefined viewpoints positioned on a unit reference sphere, said current viewpoint in respect to a viewpoint sphere radius is set equal to said viewpoint sphere radius and said current viewpoint is added to said set of selected viewpoint.

6. A system for automated viewpoint selection for 3D scenes comprising:
a bounding surface calculator for receiving a set of objects of a 3D scene and for restricting degrees of freedom available through use of a viewpoint sphere; and
a viewpoint calculator connected to said bounding surface calculator for generating viewpoints through varying degrees of automation including one of automated calculation of viewpoints, semi-automated selection, and free navigation around a restricted viewpoint space wherein said viewpoint calculator comprises:
a semi-automatic viewpoint generator connected to said bounding surface calculator wherein said semi-automatic viewpoint generator comprises:
definition means for defining a sequence of tour rings along a surface of said viewpoint sphere that slice said viewpoint sphere along an axes at regular intervals.

7. A system for automated viewpoint selection for 3D scenes comprising:
a bounding surface calculator for receiving a set of objects of a 3D scene and for restricting degrees of freedom available through use of a viewpoint sphere; and
a viewpoint calculator connected to said bounding surface calculator for generating viewpoints through varying degrees of automation including one of automated calculation of viewpoints, semi-automated selection, and free navigation around a restricted viewpoint space wherein said viewpoint calculator comprises:
a free navigation viewpoint generator connected to said bounding surface calculator wherein said free navigation viewpoint generator comprises:
navigation means for allowing a user to navigate freely about said viewpoint sphere.

8. A system for automated viewpoint selection for 3D scenes comprising:
a bounding surface calculator for receiving a set of objects of a 3D scene and for restricting degrees of freedom available through use of a viewpoint sphere; and
a viewpoint calculator connected to said bounding surface calculator for generating viewpoints through varying degrees of automation including one of automated calculation of viewpoints, semi-automated selection, and free navigation around a restricted viewpoint space wherein said viewpoint calculator comprises:
an automatic viewpoint generator connected to said bounding surface calculator;
a semi-automatic viewpoint generator connected to said bounding surface calculator; and
a free navigation viewpoint generator connected to said bounding surface calculator.

9. A method for automated viewpoint selection for 3D scenes comprising the steps of:
receiving a set of objects of a 3D scene;
restricting degrees of freedom available through use of a viewpoint sphere; and
generating viewpoints through varying degrees of automation including one of automated calculation of viewpoints, semi-automated selection, and free navigation around a restricted viewpoint space wherein generating viewpoints through automation comprises the step of:
allowing a user to navigate freely about said viewpoint sphere.

10. A method for automated viewpoint selection for 3D scenes as claimed in claim 9 wherein restricting degrees of freedom comprises the steps of:
calculating a scene sphere; and
calculating a radius of viewpoint sphere.

11. A method for automated viewpoint selection for 3D scenes as claimed in claim 10 wherein calculating a scene sphere comprises the steps of:
initializing a scene sphere radius, a center point, a bounding box and an index for array of objects in a scene;
setting said bounding box to a minimum bounding box;
incrementing an index variable for said minimum bounding box by one; and
calculating an output scene sphere where said bounding box is opposite corner points $(x_1, Y_1, z_1)$ and $(x_2, y_2, z_2)$, said center point, CP, is equal to $((x_1+x_2)/2, (y_1+y_2)/2, (z_1+z_2)/2)$ and said scene sphere radius is equal to Max(Distance$((x_1, y_1, z_1)$, CP), Distance $((xy_2, y_2, z_2)$, CP).

12. A method for automated viewpoint selection for 3D scenes as claimed in claim 10 wherein calculating a radius of viewpoint sphere comprises the step of:

calculating $\rho_0 = r_1/\sin(\theta/2)$ wherein
$r_1$ is radius of a scene sphere,
$\theta$ is a field of view, and
$\rho_0$ is radius of said viewpoint sphere.

13. A method for automated viewpoint selection for 3D scenes comprising the steps of:
receiving a set of objects of a 3D scene;
restricting degrees of freedom available through use of a viewpoint sphere; and
generating viewpoints through varying degrees of automation including one of automated calculation of viewpoints, semi-automated selection, and free navigation around a restricted viewpoint space wherein generating viewpoints through automation comprises the steps of:
initializing a set of selected viewpoints, an index for a set of predefined viewpoints positioned on a unit reference sphere, and a current viewpoint; and
calculating an output set of viewpoints where said current viewpoint is set equal to said set of predefined viewpoints positioned on a unit reference sphere, said current viewpoint in respect to a viewpoint sphere radius is set equal to said viewpoint sphere radius and said current viewpoint is added to said set of selected viewpoints.

14. A method for automated viewpoint selection for 3D scenes comprising the steps of:

receiving a set of objects of a 3D scene;

restricting degrees of freedom available through use of a viewpoint sphere; and generating viewpoints through varying degrees of automation including one of automated calculation of viewpoints, semi-automated selection, and free navigation around a restricted viewpoint space wherein generating viewpoints through automation comprises the step of:
   generating viewpoints semi-automatically which comprises the step of:
      defining a tour path that traverses a surface of said viewpoint sphere.

15. A method for automated viewpoint selection for 3D scenes comprising the steps of:

receiving a set of objects of a 3D scene;

restricting degrees of freedom available through use of a viewpoint sphere; and generating viewpoints through varying degrees of automation including one of automated calculation of viewpoints, semi-automated selection, and free navigation around a restricted viewpoint space wherein generating viewpoints through automation comprises the steps of:
   generating viewpoints automatically;
   generating viewpoints semi-automatically; and
   generating viewpoints through free navigation.

16. A method for automated viewpoint selection for 3D scenes comprising the steps of:

receiving a set of objects of a 3D scene;

restricting degrees of freedom available through use of a viewpoint sphere; and generating viewpoints through varying degrees of automation including one of automated calculation of viewpoints, semi-automated selection, and free navigation around a restricted viewpoint space wherein generating viewpoints through automation comprises the steps of:
   generating viewpoints automatically; and
   generating viewpoints semi-automatically.

17. A method for automated viewpoint selection for 3D scenes comprising the steps of:

receiving a set of objects of a 3D scene;

restricting degrees of freedom available through use of a viewpoint sphere; and generating viewpoints through varying degrees of automation including one of automated calculation of viewpoints, semi-automated selection, and free navigation around a restricted viewpoint space wherein generating viewpoints through automation comprises the steps of:
   generating viewpoints semi-automatically; and
   generating viewpoints through free navigation.

* * * * *